(12) United States Patent
Yamashita

(10) Patent No.: US 8,657,088 B2
(45) Date of Patent: Feb. 25, 2014

(54) LOCK-UP CLUTCH

(75) Inventor: Toshiya Yamashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/582,620

(22) PCT Filed: Mar. 12, 2010

(86) PCT No.: PCT/JP2010/001785
§ 371 (c)(1),
(2), (4) Date: Sep. 4, 2012

(87) PCT Pub. No.: WO2011/111117
PCT Pub. Date: Sep. 15, 2011

(65) Prior Publication Data
US 2012/0325614 A1 Dec. 27, 2012

(51) Int. Cl.
*F16H 45/02* (2006.01)
(52) U.S. Cl.
USPC ............... 192/3.29; 192/70.12; 192/113.36
(58) Field of Classification Search
USPC .................................................. 192/113.36
See application file for complete search history.

(56) References Cited

U.S. PATENT DOCUMENTS

| | | | |
|---|---|---|---|
| 4,995,500 A * | 2/1991 | Payvar | 192/113.36 |
| 5,101,953 A * | 4/1992 | Payvar | 192/113.36 |
| 6,035,992 A * | 3/2000 | Menard et al. | 192/113.36 |
| 6,702,079 B2 * | 3/2004 | Bauer et al. | 192/3.29 |
| 7,481,305 B2 | 1/2009 | Sakai et al. | |
| 7,650,977 B2 * | 1/2010 | Suzuki et al. | 192/113.36 |
| 7,967,123 B2 | 6/2011 | Ikeda et al. | |

FOREIGN PATENT DOCUMENTS

| | | |
|---|---|---|
| JP | 7 145858 | 6/1995 |
| JP | 9 257057 | 9/1997 |
| JP | 9 287622 | 11/1997 |
| JP | 2002 242954 | 8/2002 |
| JP | 2004 332779 | 11/2004 |
| JP | 2006 37991 | 2/2006 |
| JP | 2006 342819 | 12/2006 |
| JP | 2008 215498 | 9/2008 |

OTHER PUBLICATIONS

International Search Report Issued Apr. 27, 2010 in PCT/JP10/001785 Filed Mar. 12, 2010.

* cited by examiner

*Primary Examiner* — Rodney Bonck
(74) *Attorney, Agent, or Firm* — Oblon, Spivak, McClelland, Maier & Neustadt, L.L.P.

(57) ABSTRACT

Disclosed is a lock-up clutch operative to uniform temperatures on a multiple number of friction surfaces, thereby improving accuracy of a lock-up control and to prevent shudders of a vehicle from being generated. The lock-up clutch includes a front cover, a lock-up piston, a plurality of torque transmitting plates, and a plurality of friction materials formed on the torque transmitting plates and having three or more friction surfaces. The friction materials are constituted by a first friction material frictionally contactable with the front cover, a second friction material frictionally contactable with the lock-up piston, and third friction materials frictionally contactable with at least one of the plates. Three or more friction surfaces are constituted by outside friction surfaces formed on the first and second friction materials and each having a small area, and inside friction surfaces formed on the third friction materials and each having a large area.

7 Claims, 6 Drawing Sheets

LOCK-UP CLUTCH

TECHNICAL FIELD

The present invention relates to a lock-up clutch, and more particularly to a lock-up clutch used as a lock-up mechanism for a hydraulic power transmission such as a torque converter.

BACKGROUND ART

In general, an automotive vehicle is provided with a hydraulic power transmission such as a torque converter between an engine and a transmission mechanism forming part of an automatic transmission (hereinafter simply referred to as an automatic transmission). There have so far been developed a wide variety of hydraulic power transmissions one of which is operative to take a power transmitting state in which the hydraulic power can be transmitted from the engine to the input shaft of the automatic transmission (hereinafter simply referred to as a transmission input shaft) while the rotation difference between the engine and the automatic transmission input shaft is being absorbed at the starting time of the engine and other timings. The hydraulic power transmission operated always only in the hydraulic power transmission state results in decreasing a power transmission efficiency. The hydraulic power transmissions are each generally provided with a lock-up mechanism which is operative to take a lock-up state in which the power from the engine can be transmitted directly to the transmission input shaft without being transmitted through hydraulic power transmission apparatus in a specified drive state such as a high speed travelling state and the like.

The lock-up mechanism is constituted by a lock-up clutch having at least one friction engagement surface between a front cover connected with a rotation member of the engine and a lock-up piston connected with a rotation member of the transmission input shaft through a damper mechanism. The lock-up mechanism is adapted to take the lock-up state when the lock-up clutch is completely being engaged.

For this reason, there has in recent years been widely used a lock-up mechanism which is operative to execute a slip control allowing slips to be caused to the lock-up clutch, thereby expanding a wider driving area, where the power transmission can be achieved with a higher efficiency than only hydraulic power transmission, to a lower speed traveling state or at the transmission state than in the conventional driving area to improve fuel consumption.

The lock-up clutch of this kind is constituted for example by a multiple of plates having three friction surfaces or more in order to increase the heat capacity of the plates and thus suppress the temperature of the friction plates from being raised (see for example Patent Document 1).

Further, another known mechanism (see for example Patent Document 2) comprises a plurality of clutch discs having respective clutch facings (i.e., friction materials) mounted thereon. Each of the clutch facings has an outer peripheral portion formed with annular circumferential grooves and communication grooves each having one end held in communication with the annular circumferential groove and the other end open at the inner peripheral portion of the facing, thereby suppressing a drag torque from being caused at the lock-up release time.

Furthermore, still another known lock-up mechanism (see for example Patent Document 3) is constructed to have substantially annular circumferential grooves formed on friction surfaces of friction materials or engagement surfaces of a front cover or a lock-up piston to prevent shudders facilitated to be caused in the slip control state (shudders mean vibrations of the entire vehicle caused stemming from a stick-slip phenomenon and the like of the friction engagement portions forming parts of the lock-up clutch).

CITATION LIST

Patent Literature

{Patent Document 1}
Japanese Patent Application Publication No. 2004-332779
{Patent Document 2}
Japanese Patent Application Publication No. H07-145858
{Patent Document 3}
Japanese Patent Application Publication No. 2006-037991

SUMMARY OF INVENTION

Technical Problem

The previously mentioned conventional lock-up clutches, however, encounter such a problem as follows, resulting from the fact that the friction materials have three or more surfaces respectively formed with oil grooves in the same shapes and with friction surfaces having respective equal areas each other.

The front cover and the lock-up piston are each adapted to function as a frame member receiving a hydraulically pressing force, and therefore each has a thickness sufficiently larger than those of the torque transmitting plates intervening between the front cover and the lock-up piston. For this reason, the friction surfaces frictionally contactable with the torque transmitting plates each having a small thickness and the friction surfaces frictionally contactable with the front cover and the lock-up piston each having a large thickness were different in temperature, stemming from the differences of their heat capacities and their heat dissipations when the friction heats were generated on these friction surfaces. On the other hand, many friction materials have respective properties each of which has a frictional coefficient non-linearly decreased with respect to the temperatures raised on these friction surfaces. For this reason, the temperatures among the friction surfaces come to be uneven at the time of frictional heat generation caused by the slip control and the like for the friction materials, thereby making it impossible to appropriately grasp the transmission torques by the lock-up clutch. This leads to decreasing the accuracies of the lock-up controls including the slip control.

In particular in the event that the friction engagement portions between the front cover and the lock-up piston are each given a sealing function to generate a pressure difference between the front and rear sides of the lock-up piston (hereinafter simply referred to as a front-rear pressure difference), it is necessary to reduce a leak amount of operation oil to as small as possible at the friction engagement portions for securing a predetermined torque capacity even at the slip control time. The conventional lock-up clutch cannot overcome such a problem that the temperatures between the friction surfaces come to be uneven stemming from difficulties in sufficiently cooling the friction engagement portions with the operation oil as compared with a case having an independent hydraulic circuit to move the lock-up piston toward the engagement side and the disengagement side.

It is very frequent that the front cover has for example a section to be welded, and the lock-up piston is produced for example by being heat treated after being press worked. The conventional lock-up mechanism finds it difficult in view of the production cost to sufficiently suppress the swells of the engagement surfaces facing the friction materials while securing a suitable flatness to each of the torque transmitting plates to produce the plates. The conventional lock-up mechanism encounters such a problem that there are easily generated stick-slip and the like at the friction surfaces of the front cover and the lock-up piston, thereby attributing to one cause of shudders although the friction surfaces of the torque transmitting plates are easily stable in their friction engagement states.

The present invention has been made to solve the foregoing conventional problems, and has an object to provide a lock-up clutch which can uniform the friction surface temperatures between the friction materials among the torque transmitting plates and the friction materials contactable with the front cover and the lock-up piston to improve the accuracy of the lock-up control, and additionally can effectively suppress the shudders from being generated on the vehicle.

Solution to Problem

In order to solve the foregoing problems, the lock-up clutch according to the present invention (1) comprises a front cover connected with an engine side rotation member, a lock-up piston torque-transmittably connected with a transmission input shaft side rotation member through a damper device, a plurality of torque transmitting plates intervening between the front cover and the lock-up piston, and a plurality of annular friction materials forming three or more friction surfaces between two of the front cover, the lock-up piston and the torque transmitting plates, the friction materials being constituted by a first friction material frictionally contactable with the front cover, a second friction material frictionally contactable with the lock-up piston, and at least one third friction material frictionally contactable with at least one of the torque transmitting plates, the three or more surfaces being constituted by outside friction surfaces respectively formed by the first friction material and the second friction material and each having a small area, and inside friction surface formed by the third friction material and each having a large area.

By the construction as set forth in the above definition (1), when the frictional heat is generated on the three or more friction surfaces, the outside friction surfaces each having a small area become high in surface pressure, while the inside friction surfaces each having a large area become low in surface pressure, so that the amount of heat generated per unit area on the outside friction surfaces becomes larger than the amount of heat generated per unit area on the inside friction surfaces. On the other hand, the outside friction surfaces are to be in frictional contact with the front cover and the lock-up piston each having a large heat capacity, and thus the heat generated on the outside friction surfaces become easy to be dissipated, while the inside friction surfaces are to be in frictional contact with the torque transmitting plates each having a small heat capacity, and thus the heat generated on the inside friction surfaces become difficult to be dissipated. The above effect can leads to the fact that the temperatures of the first to third friction materials forming three or more friction surfaces can be uniformed, thereby making it possible to prevent the temperatures raised when the heat is frictionally generated by the slip control or other factors from being uneven among the multiple friction surfaces, and thus to improve the accuracy of the lock-up control including the slip control.

In the lock-up clutch as set forth in the above definition (1), (2) the first friction material, the second friction material, and the third friction material respectively have friction surface side portions each formed with at least one circumferential groove circumferentially extending, the circumferential grooves being constituted by first circumferential grooves respectively formed on the first friction material and the second friction material and each having a large area, and second circumferential grooves formed on the third friction material and each having a small area.

By the construction as set forth in the above definition (2), the shudders can effectively be suppressed from being generated by the first circumferential grooves formed on the first friction material and the second friction material and each having a large area although it is difficult in view of production to sufficiently remove the swells of the friction engagement surfaces of the front cover and the lock-up piston. Here, the circumferential groove is intended to indicate a groove circumferentially extending, and not limited to a circumferential groove having a fixed radius, but may include a groove having a different radius depending upon the circumferential position of the groove.

In the lock-up clutch as set forth in the above definition (2), (3) each of the first circumferential grooves has a radius preferably equal to the radius of each of the second circumferential grooves, and has a width preferably larger than the width of each of the second circumferential grooves. By this construction, the first circumferential grooves and the second circumferential grooves can be disposed at their respective suitable positions within the respective friction surface ranges in the state that the widthwise center positions (radiuses of center lines) of the outside friction surfaces are matched with the widthwise center positions of the inside friction surfaces. This makes it possible to effectively suppress the occurrence of the shudders and to uniform the temperatures of the first to third friction materials.

In the lock-up clutch as set forth in the definition (3), (4) the first circumferential grooves and the second circumferential grooves are respectively constituted by a plurality of grooves different in radius and positioned on the circumferences different from one another. This construction makes it possible to arrange the grooves capable of effectively suppressing the occurrence of the shudders.

In the lock-up clutch as set forth in any one of the above definitions (1) to (4), (5) the first friction material, the second friction material, and the third friction materials preferably have respective friction surface side portions each formed to have a plurality of narrow grooves radially extending and circumferentially spaced apart from one another, each of the narrow grooves having a width smaller than the width of the first circumferential groove. This construction makes it possible to obtain a predetermined transmitting torque while securing the pressure difference between the front and rear sides of the lock-up piston when the lock-up clutch is operated to carry out the torque transmission while allowing the slips between the front cover and the lock-up piston.

In the lock-up clutch as set forth in the above definition (5), (6) the narrow grooves are circumferentially equidistantly spaced from one another. This construction makes it possible to facilitate producing the friction materials and to secure uniform friction surfaces at the circumferential positions of each of the friction materials.

Moreover, (7) the narrow grooves may be constituted by first narrow grooves positioned radially inwardly of the circumferential grooves, and second narrow grooves radially outwardly of the circumferential grooves. This construction makes it possible to leak a small amount of the operation oil through the first narrow grooves, the circumferential grooves, and the second narrow grooves in the slip control, thereby making it possible to effectively cool the friction surfaces.

In the lock-up clutch as set forth in any one of the above definitions (1) to (7), (8) the friction materials are preferably secured to the torque transmitting plates, respectively. This construction makes it possible to facilitate forming the first to third friction materials as well as to facilitate heat dissipation from the friction surfaces of the first friction material and the second friction material.

Advantageous Effects of Invention

The lock-up clutch according to the present invention is provided with the outside friction surfaces to be respectively in frictional contact with the front cover or the lock-up piston each having a large heat capacity, and the inside friction surfaces to be respectively in frictional contact with the torque transmitting plates of a small heat capacity. The outside friction surfaces are narrow in frictional contact area, and thus become high in surface pressure while being easy to dissipate heat, thereby increasing the amount of heat generated per unit area, whereas the inside friction surfaces are wide in frictional contact area, and thus become low in surface pressure while being difficult to dissipate heat, thereby decreasing the amount of heat generated per unit area. This means that the lock-up clutch according to the present invention can uniform the temperatures of the first to third friction materials having three or more friction surfaces, thereby making it possible to prevent the temperatures to be raised when the frictional heat is generated at the friction surfaces in the slip control and other factors from becoming uneven among the multiple friction surfaces. The present invention can therefore provide a lock-up clutch which can improve the accuracy of the lock-up control including the slip control.

DESCRIPTION OF EMBODIMENTS

The preferred embodiments of the present invention will be described hereinafter with reference to the accompanying drawings.

(First Embodiment)

Figure 1:
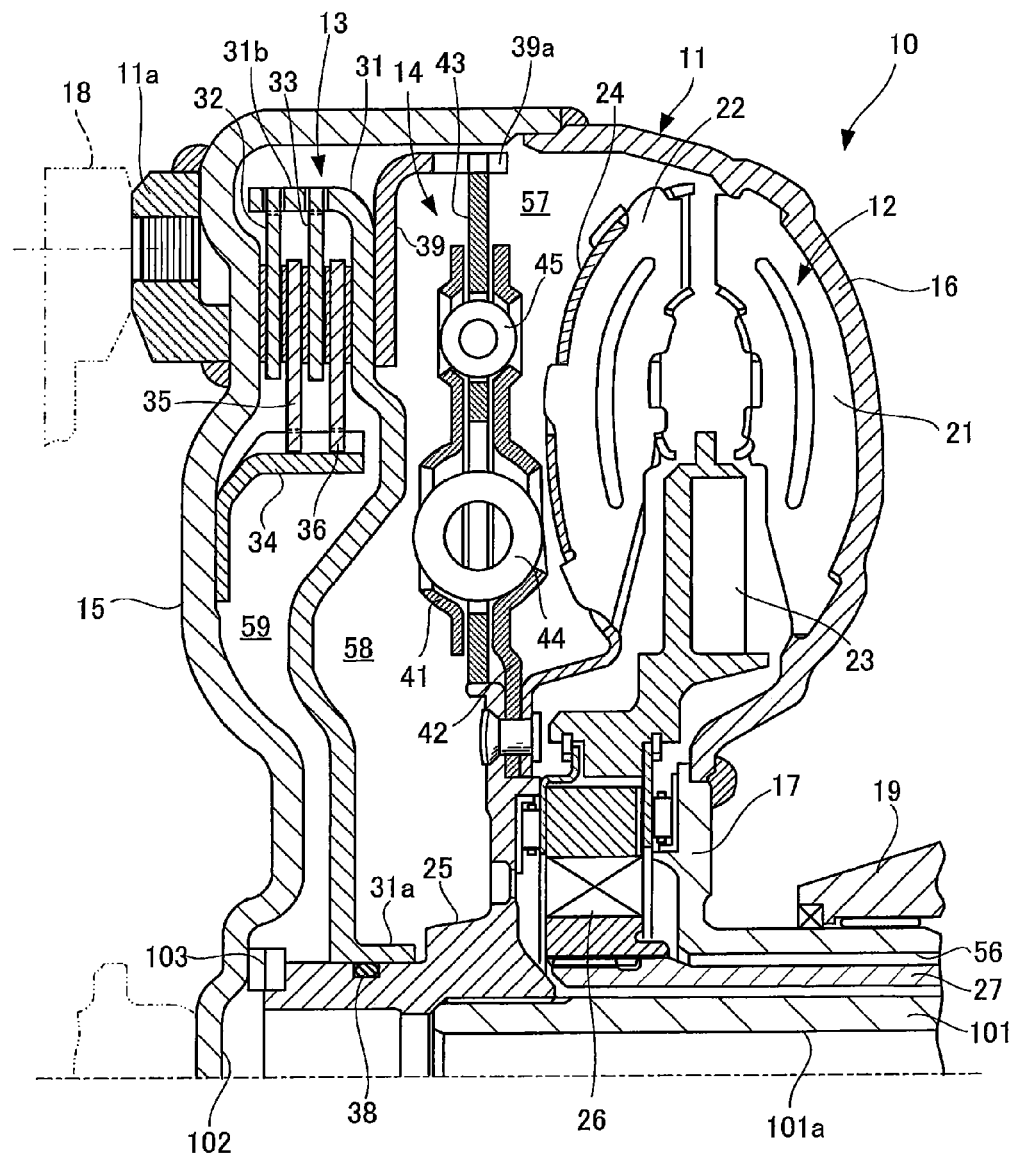
FIG. 1 is a half cross-sectional view showing a schematic construction of a torque converter provided with a lock-up clutch according to a first embodiment of the present invention.
Figure 2:
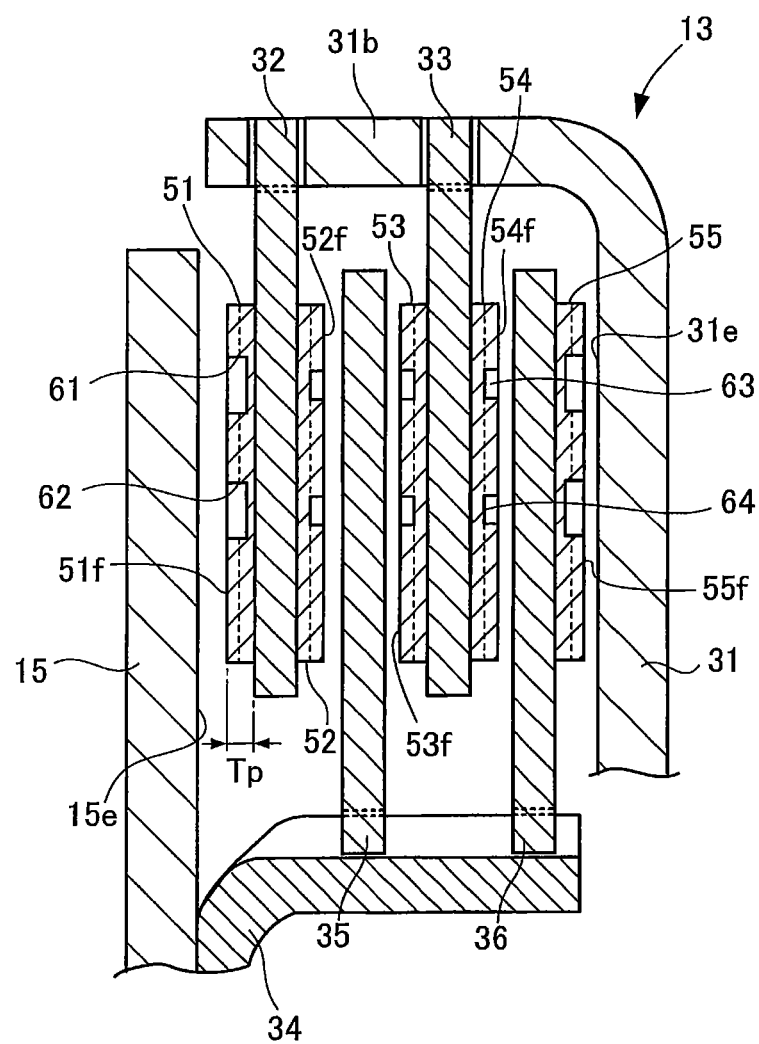
FIG. 2 is a schematic cross-sectional view showing an enlarged essential portion of the lock-up clutch according to the first embodiment of the present invention.

FIGS. 1 and 2 respectively show a lock-up clutch according to the first embodiment of the present invention, and a hydraulic power transmission provided with a lock-up mechanism assembled with the lock-up clutch. The lock-up clutch according to the present embodiment, and the hydraulic power transmission provided with this lock-up mechanism are to be mounted on a vehicle which is of a front-engine rear drive type. The right side of each of FIGS. 1 and 2 shows a rear side of the vehicle, while the left side of each of FIGS. 1 and 2 shows a front side of the vehicle. The lock-up clutch according to the present invention, and the hydraulic power transmission provided with the lock-up mechanism assembled with the lock-up clutch may, of course, be to be mounted on a vehicle which is of other type than the front-engine rear drive type.

As shown in FIGS. 1 and 2, the hydraulic power transmission 10 with the lock-up mechanism according to the present embodiment is accommodated in an automatic transmission case not shown together with an automatic transmission mechanism (not shown in detail but partly shown with only a transmission input shaft 101) at the right side of each of FIGS. 1 and 2 and a hydraulic control apparatus out of FIGS. 1 and 2.

The hydraulic power transmission 10 with the lock-up mechanism is provided with a torque converter 12, a lock-up clutch 13, and a damper device 14 which are accommodated in a cover member 11.

The cover member 11 is constituted by a front cover 15, a pump cover 16, and a support cover 17. The front cover 15 is connected with an output shaft of an engine at the left side but not shown in the drawings, and joined to the pump cover 16 by welding and the like. The support cover 17 is rotatably supported on a support member 19 (for example an oil pump body or an automatic transmission case) forming part of the automatic transmission.

The cover member 11 is fitted with a drive plate 18 (engine side rotation member) connected at the left side central portion in the drawings with the output shaft of the engine, and connected with the drive plate 18 at a plurality of outer circumferential side screw connection portions 11a.

The torque converter 12 has a pump impeller 21, a turbine runner 22 facing the pump impeller 21, and a stator 23 disposed between the pump impeller 21 and the turbine runner 22. The torque converter 12 is filled therein with operation oil, so that when the pump impeller 21 is rotated with the rotation of the engine, the operation oil in the pump impeller 21 is moved to the turbine runner 22 to rotate the turbine runner 22. The stator 23 functions to rectify the fluid flow of the operation oil returning to the pump impeller 21 from the turbine runner 22, thereby causing an amplification effect of torque to be transmitted from the pump impeller 21 to the turbine runner 22 at the engine starting time and other timings when the rotational speed difference between the pump impeller 21 and the turbine runner 22 is increased.

The pump impeller 21 is constituted by an impeller having a plurality of vanes supported on the pump cover 16. The turbine runner 22 has a plurality of vanes integrally supported on a turbine cover 24, and is connected with a turbine hub 25 (rotation member of a transmission input shaft side) through the turbine cover 24. The turbine hub 25 is splined to the transmission input shaft 101, so that the rotation of the turbine runner 22 can be transmitted to the transmission input shaft 101.

The stator 23 is supported on a cylindrical stator shaft 27 through a one-way clutch 26, and the stator shaft 27 is secured to the support member 19 of the automatic transmission side previously mentioned. The one-way clutch 26 is adapted to receive the reaction force of the stator 23 when the stator 23 is to cause the amplification effect of torque previously mentioned. When the rotational speed difference between the pump impeller 21 and the turbine runner 22 is decreased, the one-way clutch 26 is adapted to allow the stator 23 to be rotated at a rotational speed equal to that of the turbine runner 22, thereby making it possible for the pump impeller 21 and the turbine runner 22 to be rotated together.

The lock-up clutch 13 has a lock-up piston 31 having an inner peripheral flange portion 31a axially slidably fitted with the turbine hub 25. Between the inner peripheral flange portion 31a of the lock-up piston 31 and the turbine hub 25 is provided a seal ring 38.

The lock-up piston 31 has an annular outer wall portion 31b projecting leftwardly in FIG. 1 to support a plurality of first plates 32, 33 in such a manner that the first plates 32, 33 are axially (leftwardly or rightwardly in FIG. 1) slidable with respect to the annular outer wall portion 31b. Each of the first plates 32, 33 has an outer circumferential portion formed with a plurality of teeth (having no reference numeral) held in concave-convex engagement with the annular outer wall portion 31b. The first plates 32, 33 are adapted to be rotated together with the annular outer wall portion 31b.

The front cover 15 has an inner wall portion to which a clutch hub 34 is secured. The clutch hub 34 is adapted to support a plurality of second plates 35, 36 in such a manner that the second plates 35, 36 are axially (leftwardly or rightwardly in FIG. 1) slidable with respect to the clutch hub 34. Each of the second plates 35, 36 has an inner circumferential portion formed with a plurality of teeth exemplified by spline teeth (having no reference numeral) held in concave-convex engagement with the clutch hub 34. The second plates 35, 36 are adapted to be rotated together with the front cover 15 through the clutch hub 34.

The first plates 32, 33 and the second plates 35, 36 constitute a plurality of torque transmitting plates intervening between the front cover 15 and the lock-up piston 31. The portions excepting the radially outer circumferential portions of the first plates 32, 33 and the portions excepting the radially inner circumferential portions of the second plates 35, 36 axially overlap alternately.

As shown in FIG. 2 with the schematic cross-sectional shapes of the first plates 32, 33 and the second plates 35, 36, the first plate 32 has both surfaces respectively attached with annular friction materials 51, 52, while the first plate 33 has both surfaces respectively attached with annular friction materials 53, 54. The second plate 36 has one surface attached with an annular friction material 55. In contrast to the arrangement shown in FIG. 2, the second plates 35, 36 may have both surfaces respectively attached with a plurality of the friction materials 52, 53, 54, 55, while the first plate 32 may have a surface attached with the friction material 51 on the one side facing the front cover 15.

These friction materials 51 to 55 are made of a paper based material. Three or more friction surfaces are adapted to be formed among the front cover 15, the lock-up piston 31, the first plates 32, 33, and the second plates 35, 36.

More specifically, the friction materials 51 to 55 are constituted by a first annular friction material 51 frictionally contactable with an engagement surface 15e of the inner wall side of the front cover 15, a second annular friction material 55 frictionally contactable with an engagement surface 31e of the front surface side of the lock-up piston 31, and third annular friction materials 52, 53, 54 frictionally contactable with any one surface of the second plates 35, 36 (a plurality of plates). The friction materials 51 to 55 form five substantially annular belt-like friction surfaces 51f, 52f, 53f, 54f, and 55f having respectively inner and outer diameters equal to one another.

Figure 3A:
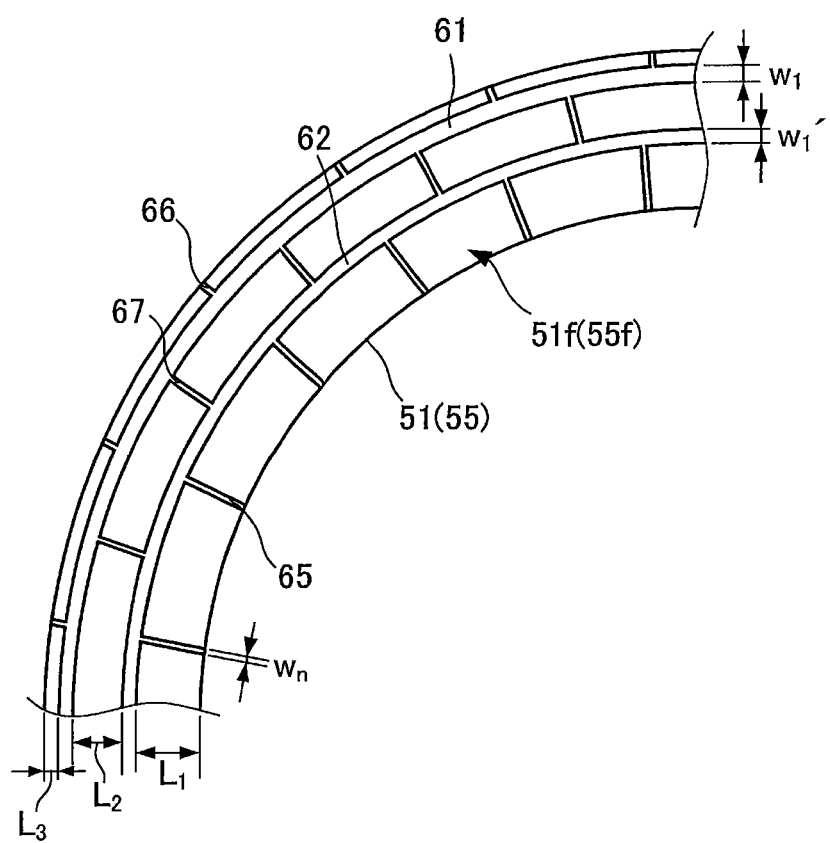
FIG. 3A is a fragmentary enlarged view of a first friction material or a second friction material forming parts of the lock-up clutch according to the first embodiment of the present invention.
Figure 3B:
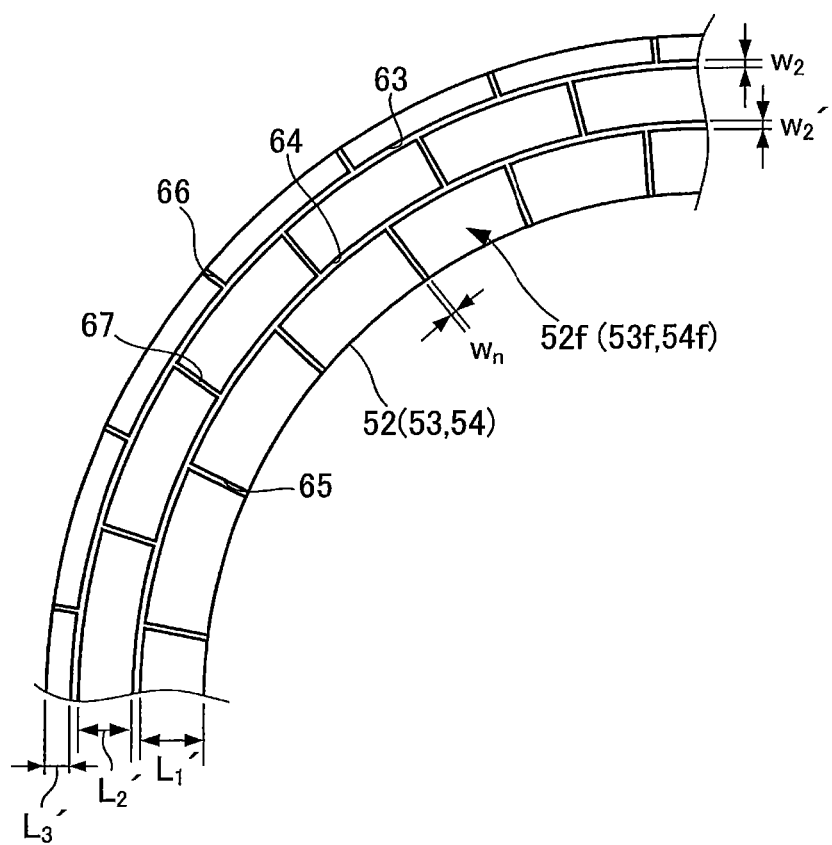
FIG. 3B is a fragmentary enlarged view of a third friction material forming part of the lock-up clutch according to the first embodiment of the present invention.

As shown in FIG. 3A and FIG. 3B, the friction surfaces 51f to 55f are constituted by outside friction surfaces 51f, 55f respectively formed by the first friction material 51 and the second friction material 55 and each having a relatively small area, and inside friction surfaces 52f, 53f, 54f respectively formed by the third friction materials 52, 53, 54 and each having a relatively large area.

The first friction material 51 and the second friction material 55 are respectively formed with at least one, for example, a plurality of circumferential grooves 61, 62, while the third friction materials 52, 53, 54 are respectively formed with at least one, for example, a plurality of circumferential grooves 63, 64.

The circumferential grooves 61, 62, 63, 64 are constituted by first circumferential grooves 61, 62 (first circumferential grooves) formed in the first friction material 51 and the second friction material 55 and each having a relatively large area (indicating an opening area on the friction surface), and second circumferential grooves 63, 64 (second circumferential grooves) formed in the third friction materials 52, 53, 54 and each having a relatively small area.

Here, the first circumferential grooves 61, 62 respectively constitute a plurality of different diameter grooves positioned on a plurality of circumferences different in radius. In other words, one of the first circumferential grooves 61 is larger in radius than the other first circumferential groove 62. Similarly, the second circumferential grooves 63, 64 respectively constitute a plurality of different diameter grooves positioned on a plurality of circumferences different in radius. In other words, one of the second circumferential grooves 63 is larger in radius than the other second circumferential groove 64. The first circumferential groove 61 has a radius equal to that of the second circumferential groove 63, while the first circumferential groove 62 has a radius equal to that of the second circumferential groove 64. The groove widths w1, w1' respectively of the first circumferential grooves 61, 62 are larger than the groove widths w2, w2' respectively of the second circumferential grooves 63, 64. The groove depths of the first circumferential grooves 61, 62 and the second circumferential grooves 63, 64 are equal to or less than the thickness Tp of the friction materials 51 to 55 formed with the first circumferential grooves 61, 62 and the second circumferential grooves 63, 64.

On the other hand, the first friction material 51, the third friction materials 52, 53, 54, and the second friction material 55 have respective friction surface side portions respectively formed with a plurality of narrow grooves 65, 66, 67 radially extending and equally spaced apart from each other in the circumferential directions of the friction materials at a predetermined spaced angle.

The narrow grooves 65 to 67 are constituted by a plurality of first narrow grooves 65 positioned radially inwardly of the first circumferential grooves 61, 62 and the second circumferential grooves 63, 64, a plurality of second narrow grooves 66 positioned radially outwardly of the first circumferential grooves 61, 62 and the second circumferential grooves 63, 64, and a plurality of third narrow grooves 67 positioned between the first circumferential grooves 61, 62 and between the second circumferential grooves 63, 64. As shown in FIG. 3A and FIG. 3B, the first narrow grooves 65, the second narrow grooves 66, and the third narrow grooves 67 have respective spaced angle set to be equal to one another. The first narrow grooves 65 and the second narrow grooves 66 are arranged to be identical in phase, while the third narrow grooves 67 is arranged to be different in phase (for example at a rotational phase displaced by half of the spaced angle) from the first narrow grooves 65 and the second narrow grooves 66. Further, each of the first narrow grooves 65 formed at the radially innermost position has the largest length L1 or L1'. Each of the second narrow grooves 66 formed at the radially outermost position has the smallest length L3 or L3'. Each of the third narrow grooves 67 formed radially between the first narrow grooves 65 and the second narrow grooves 66 has an intermediate length L2 or L2' shorter than the largest length L1 or L1' but longer than the smallest length L3 or L3'.

Further, the narrow grooves 65 to 67 have respective groove widths wn which are sufficiently smaller than the groove widths w1, w1' of at least the first circumferential grooves 61, 62 selected from among the first circumferential grooves 61, 62 and the second circumferential grooves 63, 64. The groove depths of the narrow grooves 65 to 67 is smaller than the thicknesses Tp of the friction materials 51 to 55 formed with the first circumferential grooves 61, 62 and the second circumferential grooves 63, 64. The groove widths wn and the groove depths of the narrow grooves 65 to 67 are respectively set in consideration of a leaking amount of operation oil (sealing performance at the time of slip control) leaked from an engagement side oil chamber 58 to a disengagement side oil chamber 59 at the time of slip control of the lock-up clutch 13, a set value of a thrust force in response to the pressure difference between the front and rear sides of the lock-up piston 31, and other factors. In the present embodiment, the groove widths wn of the narrow grooves 65 to 67 and the groove widths w2, w2' of the second circumferential grooves 63, 64 are equal to one another. However, the groove widths w2, w2' of the second circumferential grooves 63, 64 may be somewhat larger than the groove widths wn of the narrow grooves 65 to 67.

On the other hand, as shown in FIG. 1 and FIG. 2, the lock-up piston 31 has an outer circumferential side rear portion formed with an annular toothed member 39 having a tooth portion 39a (may be replaced by an inner splined tooth portion) rightwardly projecting in a comb shape from the lock-up piston 31 in FIG. 1.

The damper device 14 comprises one and the other turbine side damper plates 41, 42 connected with each other at cross-sectional positions not shown, a piston side damper plate 43 provided between the turbine side damper plates 41, 42 and having an outer circumferential portion splined to the annular toothed member 39 of the lock-up piston 31 side and an inner circumferential portion rotatably supported on the turbine hub 25, and a plurality of first damper springs 44 and second damper springs 45 respectively intervening between the turbine side damper plates 41, 42 and the piston side damper plate 43. The damper device 14 is adapted to have the lock-up piston 31 engageable in torque-transmittable relationship with the turbine hub 25 serving as a rotation member of the transmission input shaft 101 side as well as to reduce the torque fluctuation of the engine side through the lock-up piston 31 to suppress the torque to be inputted to the automatic transmission mechanism from being fluctuated when the lock-up clutch 13 is completely engaged (in a lock-up state).

Between the stator shaft 27 and the support cover 17 is formed an oil passage 56 which is held in communication with an operation chamber 57 formed in the cover member 11. The operation chamber 57 in the cover member 11 is divided into an engagement side oil chamber 58 and a disengagement side oil chamber 59. The engagement side oil chamber 58 is positioned at the one side (right side in FIG. 1) of the lock-up piston 31 of the lock-up clutch 13, while the disengagement side oil chamber 59 is positioned at the other side (left side in FIG. 1) of the lock-up piston 31 of the lock-up clutch 13. The oil passage 56 is held in communication with the engagement side oil chamber 58.

The transmission input shaft 101 has an axial central portion formed with an oil bore 101a which is held in communication with the disengagement side oil chamber 59 formed by the front cover 15, the turbine hub 25, the lock-up piston 31, and the transmission input shaft 101. The front cover 15, the turbine hub 25, and the transmission input shaft 101 are combined to form a communication passage 102 having the oil bore 101a held in communication with the disengagement side oil chamber 59. Between the front cover 15 and the transmission input shaft 101 is formed a thrust bearing 103 which is adapted to prevent the communication passage 102 from being closed.

The operation oil pressure in the oil passage 56 and the oil bore 101a is designed to be controlled by the hydraulic control apparatus previously mentioned, so that when the lock-up clutch 13 is engaged (at the lock-up time and at the slip control time), the hydraulic control apparatus can supply an engagement oil pressure into the engagement side oil chamber 58 through the oil passage 56, and can release the operation oil pressure in the disengagement side oil chamber 59 through the oil bore 101a and the communication passage 102.

On the other hand, the hydraulic control apparatus can supply a disengagement oil pressure into the disengagement oil chamber 59 through the oil bore 101a and the communication passage 102 when the lock-up clutch 13 is disengaged (at the disengagement time).

At the slip control time, the engagement oil pressure lower than that at the lock-up time is supplied to the engagement side oil chamber 58, or otherwise, the disengagement oil pressure lower than that at the lock-up releasing time is supplied to the disengagement side oil chamber 59, or otherwise, the above both processes of supplying the oil pressure are executed. At least one of the engagement oil pressure to be supplied to the engagement side oil chamber 58 and the disengagement oil pressure to be supplied to the disengagement side oil chamber 59 may be controlled in a multi-step.

Next, the operation of the lock-up clutch will be explained hereinafter.

The hydraulic power transmission 10 with the lock-up mechanism provided with the lock-up clutch 13 according to the present embodiment constructed as previously mentioned is operated to have the engagement state of the lock-up clutch 13 changed by the hydraulic control apparatus, or otherwise to have the slip control executed. At the times to have the engagement state of the lock-up clutch 13 changed by the hydraulic control apparatus, and to have the slip control executed, the first friction material 51 is brought into frictional contact with the front cover 15, the second friction material 55 is brought into frictional contact with the lock-up piston 31, and the third friction materials 52, 53, 54 are respectively brought into frictional contact with one of the second plates 35, 36. Therefore, there is generated frictional heat on the friction surfaces 51f to 55f.

At this time, the first friction material 51 and the second friction material 55 are respectively brought into frictional contact with the front cover 15 and the lock-up piston 31 each having a large heat capacity. This means that the outside friction surfaces 51f, 55f are less in temperature rise width with respect to the amount of heat generated, and are easy to dissipate heat. In contrast, the third friction materials 52 to 54 are respectively brought into frictional contact with the second plates 35, 36 each having a small heat capacity. This means that the inside friction surfaces 52f to 54f are relatively enlarged in temperature rise width with respect to the amount of heat generated, and are difficult to dissipate heat.

The temperatures of the third friction materials 52 to 54 respectively having the inside friction surfaces 52f to 54f are raised more than those of the first friction material 51 and the second friction material 55 respectively having the outside friction surfaces 51f, 55f if the amounts of the heat generated respectively at the friction surfaces 51f to 55f are equivalent to one another.

In the present embodiment, however, the outside friction surfaces 51f, 55f each having a relatively small area become high in surface pressure, while the inside friction surfaces 52f, 53f, 54f each having a relatively large area become low in surface pressure. This means that the value of the amount of heat generated per unit area at the outside friction surfaces 51f, 55f becomes larger than the value of the amount of heat generated per unit area at the inside friction surfaces 52f, 53f, 54f.

Therefore, the outside friction surfaces 51f, 55f each having a high surface pressure and a large value in the amount of heat generated per unit area become small in temperature rise width with respect to the amount of heat generated, and is easy to dissipate heat. In contrast, the inside friction surfaces 52f, 53f, 54f each having a low surface pressure and a small value in the amount of heat generated per unit area become relatively large in temperature rise width with respect to the amount of heat generated, and is difficult to dissipate heat. The previous operation effects can uniform the temperatures of the first friction material 51, the third friction materials 52, 53, 54, and the second friction material 55 having the friction surfaces 51f to 55f. As a result, the temperatures raised at many surfaces, i.e., the friction surfaces 51f to 55f by the frictional heat generated in the slip control and other factors can be prevented from becoming uneven among the friction surfaces 51f to 55f. In addition, the frictional coefficients of the friction surfaces 51f to 55f can uniformly be maintained, thereby making it possible to improve the accuracy of the lock-up control including the slip control.

In the present embodiment, the first friction material 51 and the second friction material 55 are respectively formed with the first circumferential grooves 61, 62 each having a relatively large area, while the third friction materials 52, 53, 54 are respectively formed with the second circumferential grooves 63, 64 each having a relatively small area. The first circumferential grooves 61, 62 formed in the first friction material 51 and the second friction material 55 to have a relatively large area can effectively suppress the occurrence of shudders even if it is difficult from the view point of producing elements or parts around the lock-up clutch to sufficiently reduce the swells of the engagement surfaces 15e, 31e of the front cover 15 and the lock-up piston 31.

The first circumferential grooves 61, 62 have two radiuses identical to those of the second circumferential grooves 63, 64, and the groove widths of the first circumferential grooves 61, 62 are larger than those of the second circumferential grooves 63, 64, so that the first circumferential grooves 61, 62 and the second circumferential grooves 63, 64 can be disposed at their respective suitable positions within the respective friction surface ranges in the state that the widthwise center positions (radiuses of center lines) of the outside friction surfaces 51f, 55f are matched with the widthwise center positions of the inside friction surfaces 52f, 53f, 54f. This makes it possible to effectively suppress the occurrence of the shudders and to uniform the temperatures of the first to third friction materials 51 to 55.

The respective friction surface side portions of the first friction material 51, the third friction materials 52, 53, 54, and the second friction material 55 are formed with a plurality of narrow grooves 65, 66, 67 radially extending and circumferentially equally spaced apart from one another, and the respective groove widths wn of the narrow grooves 65, 66, 67 become smaller than the groove widths w1, w1' of the first circumferential grooves 61, 62. This makes it possible to secure the pressure difference at the front and rear sides of the lock-up piston 31 and thus to obtain a desired transmission torque when the power is transmitted while allowing the slip between the front cover 15 and the lock-up piston 31. Moreover, the friction materials 51 to 55 can be facilitated to be produced, and the friction materials 51, 52, 53, 54, 55 can secure uniform friction surfaces, respectively, at the circumferential positions thereof.

Further, the narrow grooves 65, 66, 67 include a first narrow groove 65 positioned radially inwardly of the first circumferential grooves 61, 62 and the second circumferential grooves 63, 64, and a second narrow groove 66 positioned radially outwardly of the first circumferential grooves 61, 62 and the second circumferential grooves 63, 64, so that a small amount of operation oil can be leaked through the first narrow groove 65 and the second narrow groove 66 at the slip control time and other timings, thereby making it possible to more effectively cool the friction surfaces 51f to 55f.

In addition, the friction materials 51 to 55 are attached to the first plates 32, 33 and the second plate 36, so that the first friction plate 51, the third friction plates 52 to 54, and the second friction plate 55 can be facilitated to be formed, and the heat dissipations from the friction surfaces 51f, 55f of the first friction material 51 and the second friction material 55 can be facilitated. The friction surfaces 52f, 53f, 54f disposed between the first plates 32, 33 and between the second plates 35, 36 are adapted to be in frictional contact with the second friction plates 35, 36 supported on the front cover 15 through the clutch hub 34, so that the heat generated on the friction surfaces 52f to 54f can relatively desirably be dissipated.

It will be understood from the foregoing description that in the present embodiment, the outside friction surfaces 51f, 55f to be respectively in frictional contact with the front cover 15 and the lock-up piston 31 become high in surface pressure while being easy to dissipate heat, thereby increasing the amount of heat generated per unit area, whereas the inside friction surfaces 52f to 54f to be respectively in frictional contact with the torque transmitting plates 35, 36 become low in surface pressure while being difficult to dissipate heat, thereby decreasing the amount of heat generated per unit area, so that the temperatures of the first friction material 51, the third friction materials 52 to 54, and the second friction material 55 having many surfaces, i.e., the friction surfaces 51f to 55f can be uniformed, and the temperatures raised at many surfaces, i.e., the friction surfaces 51f to 55f by the frictional heat generated in the slip control and other factors can be prevented from becoming uneven among the friction surfaces 51f to 55f. As a result, the present embodiment can provide a lock-up clutch 13 which can improve the accuracy of the lock-up control including the slip control as well as can provide a hydraulic power transmission 10 with the lock-up mechanism provided with the lock-up clutch 13, the hydraulic power transmission 10 being excellent in accuracy of the lock-up control.

(Second Embodiment)

Figure 4A:
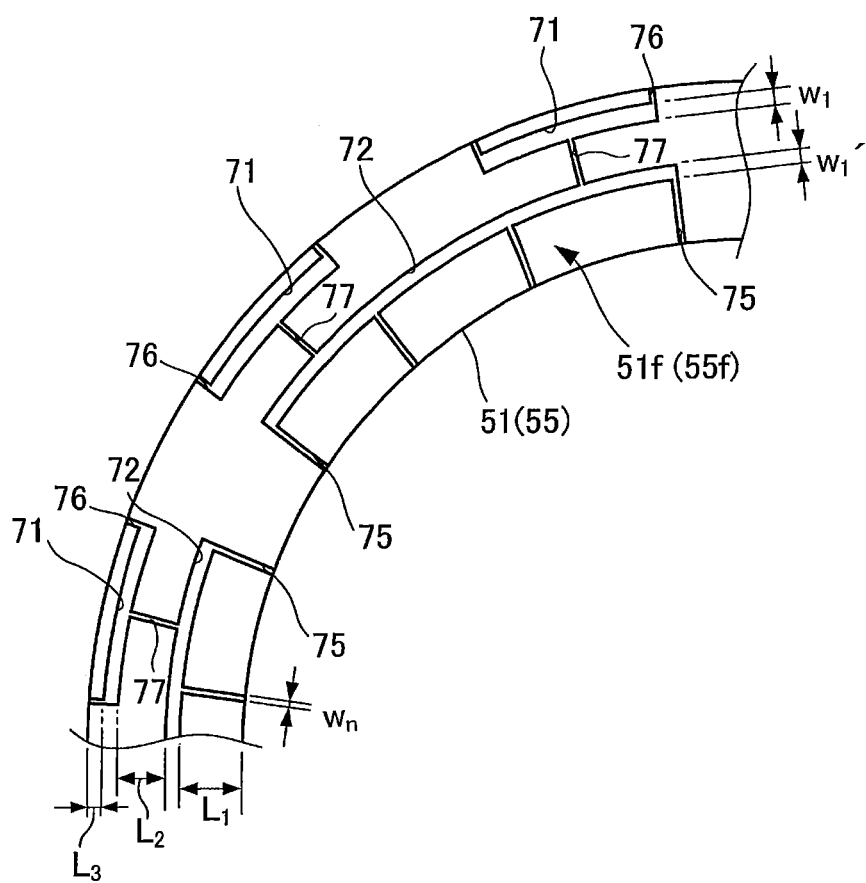
FIG. 4A is a fragmentary enlarged view of a first friction material or a second friction material forming parts of a lock-up clutch according to a second embodiment of the present invention.
Figure 4B:
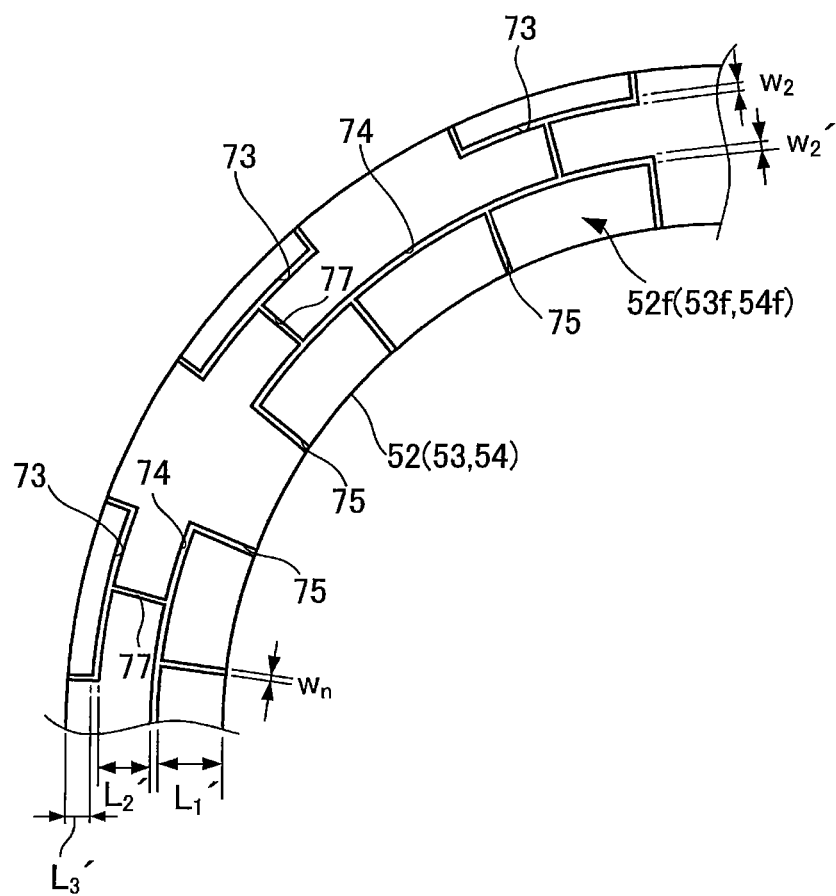
FIG. 4B is a fragmentary enlarged view of a third friction material forming part of the lock-up clutch according to the second embodiment of the present invention.

FIGS. 4A and 4B are explanation views respectively showing friction surface shapes of friction materials forming part of the lock-up clutch according to the second embodiment of the present invention. FIG. 4A shows a friction surface shape of an outside friction surface, while FIG. 4B shows a friction surface shape of an inside friction surface.

The lock-up clutch according to the present embodiment, and the hydraulic power transmission with the lock-up mechanism are substantially the same in construction as the first embodiment previously mentioned except for the shape of the friction surface (groove pattern shape), so that the similar constructions will be explained with the reference numerals and symbols used in FIG. 1, FIG. 2, FIG. 3A and FIG. 3B.

In the present embodiment as shown in FIG. 4A and FIG. 4B, the first friction material 51 and the second friction material 55 are respectively formed with outside friction surfaces 51f and 55f each having a relatively small area, while the third friction materials 52, 53, 54 are respectively formed with inside friction surfaces 52f, 53f, 54f each having a relatively large area.

More specifically, the first friction material 51 and the second friction material 55 have respective friction surface side portions which are respectively formed with at least one, for example, a plurality of arcuate circumferential grooves 71, 72 circumferentially extending, while the third friction materials 52, 53, 54 have respective friction surface side portions which are respectively formed with at least one, for example, a plurality of arcuate circumferential grooves 73, 74 circumferentially extending.

The circumferential grooves 71, 72, 73, 74 are constituted by the first circumferential grooves 71, 72 (first circumferential grooves) formed in the first friction material 51 and the second friction material 55 and each having a relatively large groove area, and the second circumferential grooves 73, 74 (second circumferential grooves) formed in the third friction materials 52, 53, 54 and each having a relatively small groove area.

Here, the first circumferential grooves 71, 72 respectively constitute a plurality of different diameter groove portions positioned at a plurality of circumferences different in radius from each other, and the first circumferential groove 71 is larger in radius than the first circumferential groove 72. Similarly, the second circumferential grooves 73, 74 respectively constitute a plurality of different diameter groove portions positioned at a plurality of circumferences different in radius from each other, and the second circumferential groove 73 is larger in radius than the second circumferential groove 74.

Further, the first circumferential groove 71 has a radius identical to that of the second circumferential groove 73, while the first circumferential groove 72 has a radius identical to that of the second circumferential groove 74. The groove widths w1, w1' respectively of the first circumferential grooves 71, 72 are larger than the groove widths w2, w2' respectively of the second circumferential grooves 73, 74. The groove depths of the first circumferential grooves 71, 72 and the second circumferential grooves 73, 74 are equal to or less than the thicknesses Tp of the friction materials 51 to 55 formed with the first circumferential grooves 71, 72 and the second circumferential grooves 73, 74.

Further, the circumferential grooves 71, 73 each having a large radius are each constituted by an arcuate groove having a center angle of for example 15 degrees. The circumferential grooves 71, 73 are circumferentially spaced apart from each other at a constant angular distance identical to the above center angle. The circumferential grooves 72, 74 each having a small radius are each constituted by an arcuate groove having a center angle of for example 45 degrees. The circumferential grooves 72, 74 are circumferentially spaced apart from each other at a constant angular distance about one third of the above center angle.

Similarly to the first embodiment previously mentioned, the first friction material 51, the third friction materials 52, 53, 54, and the second friction material 55 have respective friction surface side portions which are respectively formed with a plurality of narrow grooves 75, 76, 77 radially extending and circumferentially equally spaced apart from one another at a preliminarily set space angle.

The narrow grooves 75 to 77 are constituted by a plurality of first narrow grooves 75 positioned radially inwardly of the first circumferential grooves 71, 72 and the second circumferential grooves 73, 74, a plurality of second narrow grooves 76 positioned radially outwardly of the first circumferential grooves 71, 72 and the second circumferential grooves 73, 74, and a plurality of third narrow grooves 77 positioned between the first circumferential grooves 71, 72 and the second circumferential grooves 73, 74.

As shown in FIG. 4A and FIG. 4B, the first narrow grooves 75 and the second narrow grooves 76 have respective space angles set to be equal to each other. The third narrow grooves 77 have respective space angles set to be larger than either one of the space angles of the first narrow grooves 75 and the space angles of the second narrow grooves 76. The first narrow grooves 75 and the second narrow grooves 76 are disposed in the same phase, while the third narrow grooves 77 are disposed in the phase different from those of the first narrow grooves 75 and the second narrow grooves 76. Each of the first narrow grooves 75 formed at the radially innermost positions has a maximum length L1 or L1'. Each of the second narrow grooves 76 formed at the radially outermost positions has a minimum length L3 or L3'. Each of the third narrow grooves 77 positioned radially between the first narrow grooves 75 and the second narrow grooves 76 has an intermediate length L2, L2' shorter than the maximum length L1, L1' and longer than minimum length L3, L3'.

The narrow grooves 75 to 77 respectively have groove widths wn which are sufficiently smaller than the groove widths w1, w1' of at least the first circumferential grooves 71, 72 selected from among the first circumferential grooves 71, 72 and the second circumferential grooves 73, 74. The narrow grooves 75 to 77 respectively have groove depths which are smaller than the thicknesses Tp (see FIG. 2) of the friction materials 51 to 55 formed with the narrow grooves 75 to 77.

It will be understood from the foregoing description that in the present embodiment, the outside friction surfaces 51f, 55f to be respectively in frictional contact with the front cover 15 and the lock-up piston 31 are narrow in frictional contact area, and thus become high in surface pressure while being easy to dissipate heat, thereby increasing the amount of heat generated per unit area, whereas the inside friction surfaces 52f to 54f to be respectively in frictional contact with the torque transmitting plates 35, 36 are wide in frictional contact area, and thus become low in surface pressure while being difficult to dissipate heat, thereby decreasing the amount of heat generated per unit area, so that the temperatures of the first friction material 51, the third friction materials 52 to 54, and the second friction material 55 having many surfaces, i.e., the friction surfaces 51f to 55f can be uniformed, and the temperatures raised at many surfaces, i.e., the friction surfaces 51f to 55f by the frictional heat generated in the slip control and other factors can be prevented from becoming uneven among the friction surfaces 51f to 55f.

Also, in the present embodiment, the first friction material 51 and the second friction material 55 are respectively formed with the first circumferential grooves 71, 72 each having a relatively large area, while the third friction materials 52, 53, 54 are respectively formed with the second circumferential grooves 73, 74 each having a relatively small area. Therefore, the first circumferential grooves 71, 72 formed in the first friction material 51 and the second friction material 55 to have a relatively large area can effectively suppress the occurrence of shudders even if it is difficult from the view point of producing elements or parts around the lock-up clutch to sufficiently reduce the swells of the engagement surfaces 15e, 31e of the front cover 15 and the lock-up piston 31.

As a result, the second embodiment can obtain advantageous effects similar to those of the first embodiment.

Although the previously mentioned embodiments have been explained as being constructed to have the circumferential grooves constituted by a plurality of circumferential grooves or a plurality of arcuate grooves disposed on the circumferences identical to one another, the circumferential grooves defined in the present invention are not limited to the above mentioned circumferential grooves and arcuate grooves formed at respective set radiuses, but may include non-circular or non-arcuate grooves at respective radiuses different from one another depending upon the circumferential positions of the grooves. In other words, each of the circumferential grooves defined in the present invention may be continuous to have a certain angle range (for example, product range of the center angel of each of the circumferential grooves and the number of the circumferential grooves exceeds 180 degrees), and is not necessarily formed to have a set direction even if each of the circumferential grooves is out of the circumference position or the arcuate position having a set radius.

Each of the previously mentioned embodiments has been explained as being constructed to have the narrow grooves 65, 66, 67 circumferentially equally spaced apart from one another, however, the narrow grooves 65, 66, 67 may not necessarily be circumferentially equally spaced apart from one another.

Although each of the previously mentioned embodiments has been explained as being constructed to have four torque transmitting plates 32, 33, 35, 36 and five friction surfaces 51f to 55f, the lock-up clutch according to the present invention may be constructed to have any number of plates if at least three friction surfaces are formed by a first friction material frictionally contactable with the front cover, a second friction material frictionally contactable with the lock-up piston, and a third friction material frictionally contactable with any one of the torque transmitting plates.

As has been explained in the foregoing description, the lock-up clutch according to the present invention can uniform the temperatures of the first to third friction materials having three or more friction surfaces, thereby making it possible to prevent the temperatures to be raised when the frictional heat is generated at the friction surfaces in the slip control and other factors from becoming uneven among multiple friction faces. The present invention can achieve an advantageous effect with the previously mentioned lock-up clutch which can improve the accuracy of the lock-up control including the slip control. The lock-up clutch according to the present invention is useful for all of the lock-up clutches to be used as a lock-up mechanism for the hydraulic power transmission apparatus such as a torque converter and the like.

REFERENCE SIGNS LIST

10: hydraulic power transmission with rock-up mechanism
12: torque converter
13: lock-up clutch
14: damper device
15: front cover
15e, 31e: engagement surface
21: pump impeller
22: turbine runner
23: stator
25: turbine hub (rotation member of transmission input shaft side)
27: stator shaft
31: lock-up piston
32, 33: first plate (torque transmitting plate)
35, 36: second plate (torque transmitting plate)
51: first friction material (friction material)
51f, 52f, 53f, 54f, 55f: friction surface
52, 53, 54: third friction material (friction material)
55: second friction material (friction material)
56: oil passage
58: engagement side oil chamber
59: disengagement side oil chamber
61, 62: first circumferential groove (circumferential groove, first circumferential groove, a plurality of grooves different in radius)
63, 64: second circumferential groove (circumferential groove, second circumferential groove, a plurality of grooves different in radius)
65, 75: first narrow groove (narrow groove)
66, 76: second narrow groove (narrow groove)
67, 77: third narrow groove (narrow groove)
71, 72: first circumferential groove (circumferential groove, first circumferential groove, a plurality of grooves different in radius)
73, 74: second circumferential groove (circumferential groove, second circumferential groove, a plurality of grooves different in radius)
101: transmission input shaft
101a: oil bore
L1, L1': maximum length
L2, L2': intermediate length
L3, L3': minimum length
w1, w1', w2, w2': groove width

The invention claimed is:

1. A lock-up clutch comprising: a front cover connected with an engine side rotation member, a lock-up piston torque-transmittably connected with a transmission input shaft side rotation member through a damper device, a plurality of torque transmitting plates intervening between the front cover and the lock-up piston, and a plurality of annular friction materials forming three or more friction surfaces between two of the front cover, the lock-up piston and the torque transmitting plates, the friction materials being constituted by a first friction material frictionally contactable with the front cover, a second friction material frictionally contactable with the lock-up piston, and at least one third friction material frictionally contactable with at least one of the torque transmitting plates, the three or more surfaces being constituted by outside friction surfaces respectively formed by the first friction material and the second friction material and each having a small area, and inside friction surface formed by the third friction material and each having a large area, the first friction material, the second friction material, and the third friction material respectively having friction surface side portions each formed with at least one circumferential groove circumferentially extending, the circumferential grooves being constituted by first circumferential grooves respectively formed on the first friction material and the second friction material and each having a large area, and second circumferential grooves formed on the third friction material and each having a small area.

2. The lock-up clutch as set forth in claim 1, in which each of the first circumferential grooves has a radius equal to the radius of each of the second circumferential grooves, and has a width larger than the width of each of the second circumferential grooves.

3. The lock-up clutch as set forth in claim 2, in which the first circumferential grooves and the second circumferential grooves are respectively constituted by a plurality of grooves different in radius and positioned on the circumferences different from one another.

4. The lock-up clutch as set forth in claim 3, in which the first friction material, the second friction material, and the third friction materials have respective friction surface side portions each formed to have a plurality of narrow grooves radially extending and circumferentially spaced apart from one another, each of the narrow grooves having a width smaller than the width of the first circumferential groove.

5. The lock-up clutch as set forth in claim 4, in which the narrow grooves are circumferentially equidistantly spaced from one another.

6. The lock-up clutch as set forth in claim 4, in which the narrow grooves are constituted by first narrow grooves positioned radially inwardly of the circumferential grooves, and second narrow grooves radially outwardly of the circumferential grooves.

7. The lock-up clutch as set forth in claim 1, in which the friction materials are secured to the torque transmitting plates, respectively.

\* \* \* \* \*